US006830414B2

(12) United States Patent
Kia et al.

(10) Patent No.: US 6,830,414 B2
(45) Date of Patent: Dec. 14, 2004

(54) CANISTER POWDER PAINT DELIVERY APPARATUS AND METHOD

(75) Inventors: Sheila Farrokhalaee Kia, Bloomfield Hills, MI (US); Christopher M. Murphy, Sterling Heights, MI (US); Brian Thadeus Prylon, West Bloomfield, MI (US); Frank P. Rauch, Wyandotte, MI (US); Fred I. Blair, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 12 days.

(21) Appl. No.: 10/400,830

(22) Filed: Mar. 27, 2003

(65) Prior Publication Data

US 2004/0191005 A1 Sep. 30, 2004

(51) Int. Cl.[7] .......................... B65G 53/38

(52) U.S. Cl. .......................... 406/138; 406/45; 406/123; 239/654

(58) Field of Search .......................... 406/45, 123, 138; 239/654

(56) References Cited

U.S. PATENT DOCUMENTS

| | | | | | |
|---|---|---|---|---|---|
| 3,272,562 | A | * | 9/1966 | Kauffman | 406/124 |
| 3,740,612 | A | * | 6/1973 | Gauthier et al. | 361/227 |
| 4,044,175 | A | | 8/1977 | Coxon et al. | 427/195 |
| 4,367,987 | A | * | 1/1983 | Walters | 406/15 |
| 4,881,563 | A | | 11/1989 | Christian | 134/166 |
| 4,953,792 | A | * | 9/1990 | Evans | 239/654 |
| 5,140,935 | A | | 8/1992 | Gruber | 118/621 |
| 5,269,463 | A | * | 12/1993 | Burks | 239/85 |
| 5,447,394 | A | * | 9/1995 | Shepard | 406/48 |
| 5,489,166 | A | * | 2/1996 | Schmit | 406/137 |
| 5,928,483 | A | | 7/1999 | Szpak et al. | 204/290 |
| 6,099,898 | A | | 8/2000 | Joyce et al. | 427/195 |
| 6,325,214 | B1 | | 12/2001 | Smithson | 206/554 |
| 6,375,093 | B1 | | 4/2002 | Fulkerson et al. | 239/112 |

* cited by examiner

*Primary Examiner*—Joe Dillon, Jr.
(74) *Attorney, Agent, or Firm*—Laura C. Hargitt

(57) ABSTRACT

An apparatus and method for supplying multi-color powder paint material to an applicator in which at least one canister is used. This invention can be utilized with multiple or with a single color of powder paint material. The preferred system includes two canisters that alternate in supplying powder to the applicator. While one canister supplies powder to the applicator, the other canister is purged of the previous material and filled with the next material to be sprayed. The canister has an interior sized to store a predetermined quantity of powder material. During operation, a powder transfer pump and a color changer transfer powder material from a storage container/hopper to the canister interior. A venturi pump then supplies the applicator with powder. After the object is painted, purge air is opened and the canister is purged of the previous material. The canister is then ready to start another cycle.

4 Claims, 1 Drawing Sheet

CANISTER POWDER PAINT DELIVERY APPARATUS AND METHOD

BACKGROUND OF THE INVENTION

The present invention relates in general to powder paint transfer and distribution systems for use with powder coating applicators and, in particular, to a canister powder paint delivery apparatus and method for applying both multi-color powder (i.e. color key and or color specific) and single color powder.

In prior art systems, the powder paint is unloaded from a tote bulk storage system by a vacuum transport directly to a receiver. Alternatively, the powder paint is gravity fed from a bag bulk storage system into a vacuum stream. The unloaded powder in the receiver is then conditioned utilizing a sieve and gravity fed to a primary fluidized hopper. The powder paint is transferred from the primary hopper to a secondary fluidized hopper located approximately 25 feet from the point of application. The powder paint is fed from the secondary hopper or hoppers to the applicators. Disadvantageously, one complete distribution system that includes the bulk storage, sieve, primary hopper and secondary hopper is needed for each color of powder to be sprayed. Typically, one secondary hopper can supply six applicators, also a third level of hoppers is added for cut-ins and supplemental robotic application. Typically, there is one hopper per color of powder connected to each robot. This system requires that each color of powder have a series of hoppers, so that each color added to the system increases the number of primary, secondary, and robot hoppers required in the system. A venturi pumping system is used to transfer the powder paint material between the hoppers and the applicator. For example, a three color color-keyed and ten color color-specific system requires ten to thirteen primary hoppers, fifty to sixty secondary and/or robot hoppers, over one hundred fifty venturi pumps, and over twenty color changers.

It is desirable, therefore, to provide a simple, inexpensive, and efficient apparatus for supplying multi-color powder paint material to an applicator in a powder paint delivery system.

SUMMARY OF THE INVENTION

The present invention concerns an apparatus for supplying powder paint material to an applicator utilizing at least one canister; preferably a first and a second canister. Preferably each of the first and second canisters include a compressed air inlet and a dump line that is used for purging the canister of previously used powder so that a different color may be subsequently utilized for the same canister. The interiors of the first and second canisters define a fluidization air plenum therein. The plenum includes a porous plate disposed therein, which is connected to a fluidization air inlet and, when supplied with fluidization air, discussed in more detail below, fluidizes the powder paint in a well known manner.

The apparatus for at least two colors of powder includes at least two storage containers/hoppers each having at least two powder material outlets. Each of the at least two storage containers contain a different color powder material for use in a painting operation. The apparatus also includes at least two color changers each having at least two inlets and an outlet. A first one of the two inlets of each of the at least two color changers is connected to an associated one of the at least two outlets of a first one of the at least two storage containers/hoppers. A second one of the two inlets of each of the at least two color changers is connected to an associated one of the at least two outlets of a second one of the at least two storage containers/hoppers. The first and second canisters each have an inlet connected to the outlet of an associated one of the at least two color changers and an outlet. At least a third color changer includes at least two inlets each connected to an associated one of the outlets of the at least two canisters. The third color changer includes an outlet adapted to be connected to an applicator.

In operation, powder is sent from a hopper or bulk storage directly to one of the first and second color changers. The one of the first and second color changers opens an outlet valve for the correct color powder and allows the powder to flow into the canister. The powder is then pumped from the canister to the third color changer, which selects which of the first and second canisters is to feed the applicator.

While one of the first and second canisters is spraying powder, the other of the first and second canisters is cleaned and purged by opening the dump line and blowing the canister out with compressed air from the compressed air inlet. Once the canister is cleaned and purged, it is filled with the correct color of powder through the powder inlet. Prior to being sent to the applicator, the powder in the canister is kept in suspension by adding compressed air from the fluidization air inlet into the fluidization air plenum. The porous plate allows the air to pass, thus fluidizing the powder within the canister in a well known manner. Alternatively, the fluidization air may not be needed for the canister depending on the powder to be fluidized, the motion of the canister, and the duration the powder will be in the canister.

Alternatively, if the canister's purge and fill process can be accomplished in the time allowed between painting vehicles, parts, or both, then only one canister may be required. Alternatively, the canisters can be sized to allow more than one applicator to be supplied by a single canister. The canisters can be sized advantageously to paint vehicles, parts, or both, in a batch method wherein one vehicle after another is painted with the same color.

The means for transferring powder paint from the storage containers/hoppers to the canisters and from the canisters to the applicator can be via a system that uses a vacuum transport, venturi pumps, or the like, or any other viable transfer means including, but is not limited to, a dense phase transfer system.

The method and apparatus according to the present invention is capable of supplying the powder paint directly from bulk storage to the applicators thereby reducing the number of hoppers and transfer equipment, which represents a very significant cost savings in automotive powder coating operations both in terms of capital and operating expense. A three color-keyed and ten color-specific system according to the present invention will advantageously eliminate the primary hoppers as well as the robot hoppers. Depending on the powder transport method used (i.e. dense phase), it may also be possible to eliminate the secondary hoppers allowing transfer of powder directly from the bulk storage to the applicator via the canister.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
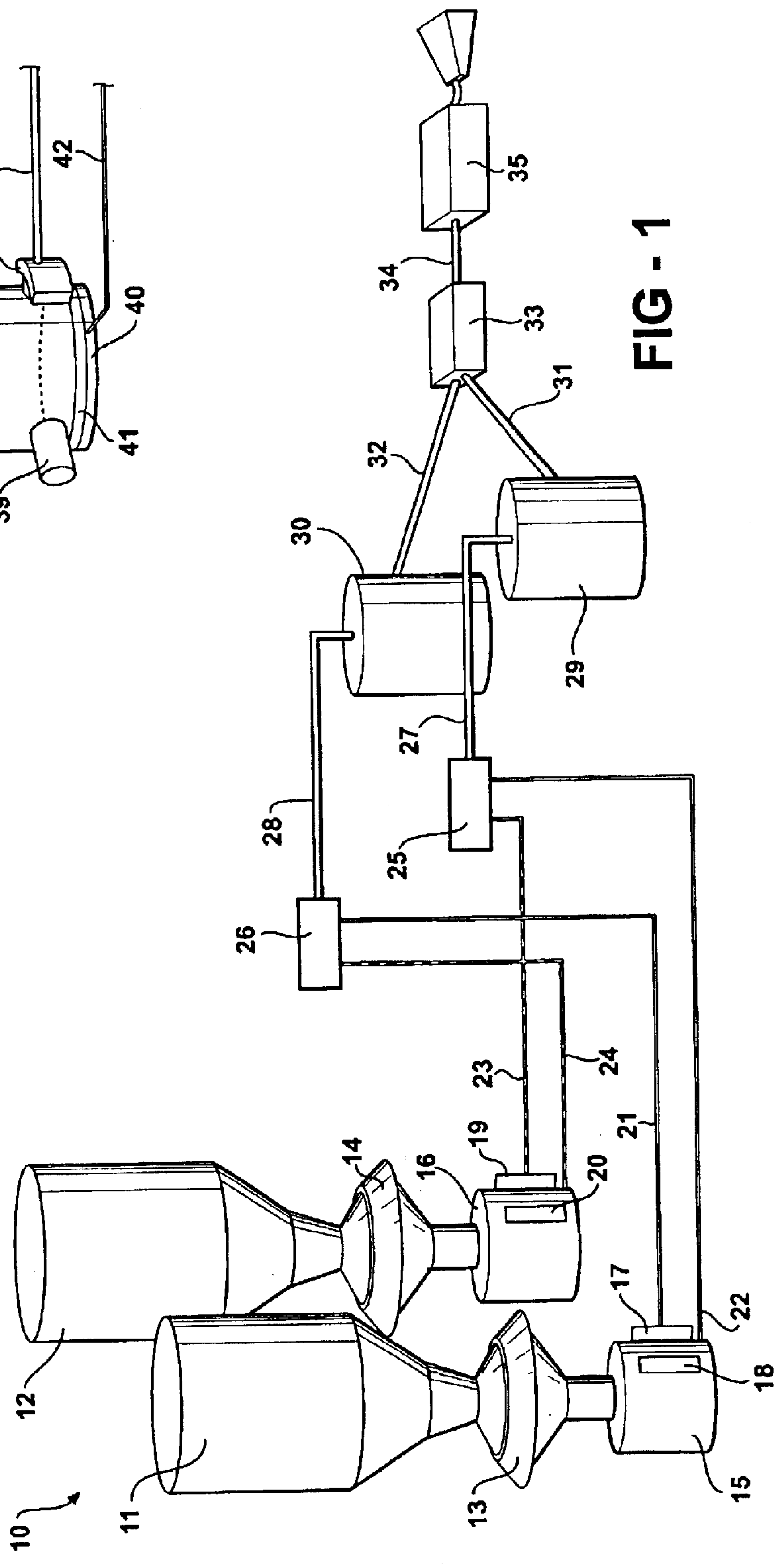
FIG. 1 is a schematic view of an apparatus for supplying powder paint material to an applicator in a powder paint delivery system in accordance with the present invention.

Referring now to FIG. 1, an apparatus for supplying powder paint material to an applicator in a powder paint delivery system in accordance with the present invention is indicated generally at 10. The apparatus 10 includes at least two storage containers, such as a first container 11 and a second container 12. The containers 11 and 12 each have an outlet connected to an inlet of respective first and second sieve members 13 and 14. The storage containers 11 and 12 are adapted to be filled by bulk storage bags (not shown) or the like of a powder paint material (not shown). Each of the storage containers 11 and 12 preferably contains a different color powder material for use in a painting operation. The sieve members 13 and 14 are operable to condition the powder material and each has an outlet connected to an inlet of respective first and second hoppers 15 and 16.

The first hopper 15 has a first outlet connected to an inlet of a first powder transfer means 17 and a second outlet connected to an inlet of a second powder transfer means 18. Similarly, the second hopper 16 has a first outlet connected to an inlet of a third powder transfer means 19 and a second outlet connected to an inlet of a fourth powder transfer means 20. The powder transfer means 17 through 20 can use venturi pumps or the like, or any other viable transfer means including, but not limited to, a dense phase transfer system or any other transfer system.

Each of the powder transfer means 17 through 20 has an outlet connected to a respective one of first through fourth transfer lines 21, 22, 23, and 24. The second transfer line 22 is connected at a first inlet of a first color changer 25 and the first transfer line 21 is connected at a first inlet of a second color changer 26. The fourth transfer line 24 is connected at a second inlet of the first color changer 25 and the third transfer line 23 is connected at a second inlet of the second color changer 26. The first color changer 25 has an outlet connected to a first changer line 27 and the second color changer 26 has an outlet connected to a second changer line 28.

A first canister 29 has an inlet connected to the first changer line 27 and a second canister 30 has an inlet connected to the second changer line 28. An outlet of the first canister 29 is connected to a first canister line 31 and an outlet of the second canister 30 is connected to a second canister line 32. The canister lines 31 and 32 are connected to first and second inlets respectively of a two color, color changer 33 having an outlet connected to an outlet line 34. The line 34 is connected to an inlet of a powder paint applicator 35 for applying the powder paint material to an object such as a vehicle body or a body part for a vehicle.

Figure 2:
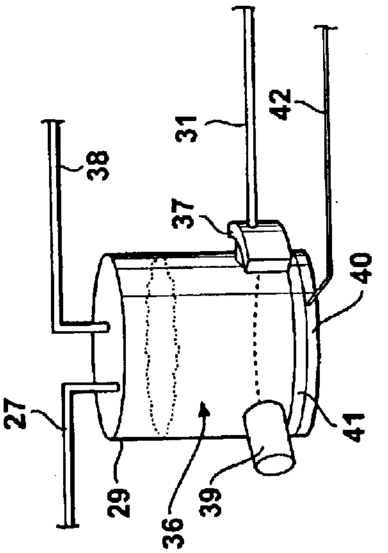
FIG. 2 is an enlarged perspective schematic view of one of the canisters shown in FIG. 1.

Referring now to FIG. 2, the first canister 29 is shown with the first changer line 27 connected to the inlet in a top wall and a quantity of powder paint material 36 disposed therein. The outlet of the canister 29 is connected to the first canister line 31 through a venturi feed pump 37 operable to transfer the powder 36 from the canister 29 through the line 31 to the changer 33 shown in FIG. 1. A purge air inlet in the top wall is connected to a purge air line 38 and a dump valve/outlet 39 is provided at a lower portion of the canister 29. When purge air is provided to the interior of the canister 29 through the line 38, any of the powder 36 remaining will exit through the dump valve/outlet 39 when it is opened. A lower portion of the canister 29 has a fluidization air plenum 40 formed therein separated from the upper portion by a porous plate 41 horizontally disposed in the canister. A fluidization air inlet line 42 is connected to the fluidization air plenum 40 at an air inlet of the canister. Air is introduced to the plenum 40 from the line 42 and flows upwardly through the porous plate 41 to maintain the powder material 36 in suspension. The second canister 30 has a similar construction.

In operation, the powder paint material is received in the storage containers 11 and 12 and gravity fed directly to the respective sieve members 13 and 14. The powder paint material is conditioned as it drops through the sieve members 13 and 14, and is collected in the respective first and second hoppers 15 and 16. The powder material can be transferred from the first hopper 15 to fill, for example, the first canister 29 utilizing the second powder transfer means 18, the second transfer line 22, the first color changer 25 and the first changer line 27. If the same color is to be used to paint two or more objects in sequence, a similar filling process utilizes the first powder transfer means 17, the first transfer line 21, the second color changer 26 and the second changer line 28 to fill the second canister 30. The second hopper 16 and the associated system components operate in a similar manner to transfer and distribute a second color powder paint material.

If two objects are to be painted different colors in sequence, the apparatus 10 is operated in the following manner. Assume, for example, that the first canister 29 contains a first color powder material required to paint the first object and the second canister 30 does not contain either the first color powder material or a second color powder material required to paint the second object. While the first canister is supplying the first color powder material to the applicator 35 to paint the first object, the second canister 30 can be purged and filled with the second color powder material. As soon as the first object is painted, the color changer 33 disconnects the applicator 35 from the first canister 29 and connects it to the second canister 30 through the second canister line 32.

If the purge and fill process for one of the canisters 29 and 30 can be accomplished in the time available between painting objects, then only one canister may be required to switch between colors. Alternatively, if two or more objects are to be painted with the same color, than the same canister 29 or 30 may be refilled without purging until another color is to be sprayed. Furthermore, the canisters 29 and 30 can be sized to allow more than one of the applicators 35 to be connected thereto for simultaneous spraying. The canisters 29 and 30 can be sized to paint single objects from one fill to permit maximum flexibility in changing colors when used with an assembly line. Alternatively, the canisters 29 and 30 may also be sized to accommodate batch painting in which the canisters 29 or 30 may hold enough material to paint multiple objects in a row with the same color.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A canister for supplying a selected color powder paint material to an applicator in a powder paint delivery system comprising:

a hollow housing for storing a powder paint material;

an inlet line in fluid communication with an interior of said housing and adapted to be connected to an outlet of a color changer;

a porous plate disposed in said housing separating said housing interior into a fluidization air plenum and a powder paint material storage portion;

a fluidization air line in fluid communication with said fluidization air plenum for supplying air to suspend powder paint material in said storage portion;

a purge air line in fluid communication with said storage portion; and a dump valve in fluid communication with said storage portion, whereby when air is supplied through said purge air line and said dump valve is opened, any powder paint material in said storage portion is expelled through said dump valve thereby cleaning said storage portion prior to receiving a different color powder paint material.

2. The canister according to claim 1 including an outlet line in fluid communication with the interior of said housing and an applicator.

3. The canister according to claim 1 including a powder material transfer means attached to said outlet line for transferring the powder paint material from said housing to the applicator.

4. The canister according to claim 1 wherein said powder material transfer means is one of a venturi pump system and a dense phase transfer system.

* * * * *